(12) United States Patent
Matthews

(10) Patent No.: US 7,302,763 B1
(45) Date of Patent: Dec. 4, 2007

(54) ADJUSTABLE JIG FOR USE WHEN INSTALLING BARGEBOARDS

(76) Inventor: Mark A. Matthews, 2 Thatch Cottage, Chruch Lane Potter Heigham, Great Yarmouth (GB) NR29 5LR (\*) Notice: Subject to any disclaimer, the term of this patent is extended or adjusted under 35 U.S.C. 154(b) by 0 days.

(21) Appl. No.: 11/293,051

(22) Filed: Dec. 5, 2005

(51) Int. Cl.
*G01B 3/14* (2006.01)

(52) U.S. Cl. .............................. 33/562; 33/451; 33/452

(58) Field of Classification Search .......... 33/415–419, 33/451, 452, 454, 455, 456, 459, 460, 461, 33/462, 464, 562, 403; D10/61, 62, 64, 65, D10/69
See application file for complete search history.

(56) References Cited

U.S. PATENT DOCUMENTS

| | | | | |
|---|---|---|---|---|
| 278,405 | A | * | 5/1883 | Cumming et al. ............. 33/456 |
| 735,207 | A | * | 8/1903 | Campbell ..................... 33/419 |
| 820,448 | A | * | 5/1906 | Turpin ......................... 33/456 |
| 1,040,239 | A | | 10/1912 | Rarey |
| 1,103,344 | A | * | 7/1914 | Blofield ....................... 33/460 |
| 1,157,514 | A | * | 10/1915 | Earl ............................. 33/460 |
| 1,524,392 | A | | 1/1925 | East |
| 1,636,637 | A | * | 7/1927 | Hutchison .................... 33/454 |
| 1,900,196 | A | | 3/1933 | Pack |
| 2,959,861 | A | * | 11/1960 | Stromquist .................. 33/419 |
| D220,061 | S | * | 3/1971 | Kerns .......................... D10/62 |
| 4,882,846 | A | * | 11/1989 | Reed ............................ 33/464 |
| D333,991 | S | * | 3/1993 | Lee .............................. D10/62 |
| 5,208,990 | A | * | 5/1993 | Woerlein ..................... 33/354 |
| 5,384,967 | A | | 1/1995 | Helmuth |
| 5,446,969 | A | * | 9/1995 | Terenzoni .................... 33/419 |
| 5,461,794 | A | * | 10/1995 | Huang .......................... 33/470 |
| 5,617,642 | A | * | 4/1997 | Marios ......................... 33/526 |
| 6,101,730 | A | | 8/2000 | Marino |
| 6,105,266 | A | * | 8/2000 | Cote ............................ 33/451 |
| D432,928 | S | | 10/2000 | Garrett |
| 6,237,237 | B1 | * | 5/2001 | McKenna et al. ............ 33/374 |
| 6,785,977 | B1 | * | 9/2004 | Crichton ...................... 33/613 |
| 7,095,378 | B1 | * | 8/2006 | Paquette ...................... 343/757 |

FOREIGN PATENT DOCUMENTS

| | | | | |
|---|---|---|---|---|
| EP | 454626 | A2 | * | 10/1991 |
| GB | 672744 | A | * | 5/1952 |
| GB | 2218205 | A | * | 11/1989 |
| GB | 2258532 | A | * | 2/1993 |
| GB | 2426339 | A | * | 11/2006 |

\* cited by examiner

*Primary Examiner*—R. Alexander Smith

(57) ABSTRACT

An adjustable jig includes rigidly formed arms that have rectilinear shapes provided with opposite edges, an elongated central opening formed therein and opposed ends abutted with adjacent arm ends. Fasteners are interfitted within the arm openings such that the arms become statically affixed to each other and are detachable from associated ones of the openings. Each fastener includes a tri-lobed nut that has a threaded bottom end. A cap is conjoined to the threaded bottom end and has an outwardly beveled perimeter converging upwardly towards a bottom surface of one of the arms. Each arm has two of the fasteners interfitted through the opening associated therewith. A level gauge is included for establishing a horizontal plane along one arm and is releasably conjoined to a top surface of one arm and positioned at an interior edge thereof.

12 Claims, 2 Drawing Sheets

ADJUSTABLE JIG FOR USE WHEN INSTALLING BARGEBOARDS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to adjustable jigs and, more particularly, to an adjustable jig for use when INSTALLING bargeboards.

2. Prior Art

Numerous types of template devices for indicating at which point and along which line a surface should be cut have been provided in the prior art. Unfortunately, such devices are usually limited to one specific shape which greatly limits the use thereof. Further additions to the prior art introduced templates that have an adaptable body. A disadvantage of such templates, however, is the fact that they are limited to shapes that are triangular and square in nature, and tend not to be adaptable among a variety of shapes either. In most instances, it is to the tradesman's advantage to know whether the surface they will be working on is level or not. Unfortunately, no prior art template of knowledge is provided with a level indicator, which requires the laborer to carry a separate level gauge. This can be cumbersome and inconvenient, especially in confined working areas.

Accordingly, a need remains for an adjustable jig for use when INSTALLING bargeboards in order to overcome the above-noted shortcomings. The present invention satisfies such a need by providing an adjustable jig that is convenient and easy to use, increases the speed and accuracy with which a task is completed, and improves the laborer's efficiency. Such an adjustable jig reduces the amount of time and effort required to lay out and produce replacement bargeboards during the course of a vinyl soffit and fascia installation project. The stainless steel, aluminum or plastic construction of the apparatus further prevents same from being affected by corrosion, thus ensuring repeated use thereof.

BRIEF SUMMARY OF THE INVENTION

In view of the foregoing background, it is therefore an object of the present invention to provide an adjustable jig for use when INSTALLING bargeboards. These and other objects, features, and advantages of the invention are provided by an adjustable jig for assisting an operator when attaching a bargeboard to a gable end of a house and thereby save time and materials when a box end is required to finish off an end of a bargeboard where it meets a fascia on the house.

The adjustable jig includes a plurality of arms formed from rigid material. Each arm has a rectilinear shape provided with a centrally registered longitudinal axis and oppositely registered edges that are equidistantly spaced from the respective axes. Such edges of each arm travel parallel to the respective axes and along an entire longitudinal length thereof respectively. Each arm is provided with an elongated central opening formed therein that is disposed along the respective axis. Each of the arms has axially opposed ends abutted directly with adjacent ones of the ends of the arms respectively.

First and second ones of the arms are preferably registered parallel to each other. A third one of the arms may be medially disposed therebetween and aligned orthogonal to the respective longitudinal axes of the first and second arms. Fourth and fifth ones of the arms are preferably situated obliquely to the first and second arms and are directly connected thereto respectively. Such fourth and fifth arms extend laterally outwardly and away from the first and second arms wherein distal ends of the fourth and fifth arms are directly conjoined at a location defined between the first and second arms. The first arm may be selectively movable along a path corresponding to the opening associated with the third arm and the opening associated with the fourth arm. The second arm may be selectively movable along a path defined by a relative position of the opening associated with the third arm and the opening associated with the fifth arm.

A plurality of fasteners are directly interfitted within at least two of the openings associated with at least two of the arms such that the at least two arms conveniently and effectively become statically affixed to each other during operating conditions. Each fastener is detachable from associated ones of the openings such that the arms can effectively be linearly biased along the openings respectively. Each fastener includes a tri-lobed nut that has a threaded bottom end positioned through selected ones of the openings. A cap is directly conjoined to the threaded bottom end of the tri-lobed nut. Such a cap has an outwardly beveled perimeter converging upwardly towards a bottom surface of one of the arms such that adjacently conjoined ones of the arms remain statically conjoined during operating conditions. Each arm has at least two of the fasteners interfitted through the openings associated therewith respectively.

A level gauge is included for advantageously and effectively establishing a horizontal plane along one of the arms. Such a level gauge is releasably conjoined directly to a top surface of the one arm and positioned at an interior one of the edges associated with the one arm. The second arm preferably includes a plurality of clips directly attached thereto and spaced apart adjacent to the opening thereof. Such clips are directly abutted on opposed sides of the level gauge such that the level gauge is advantageously and effectively maintained at a fixed position during operating conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
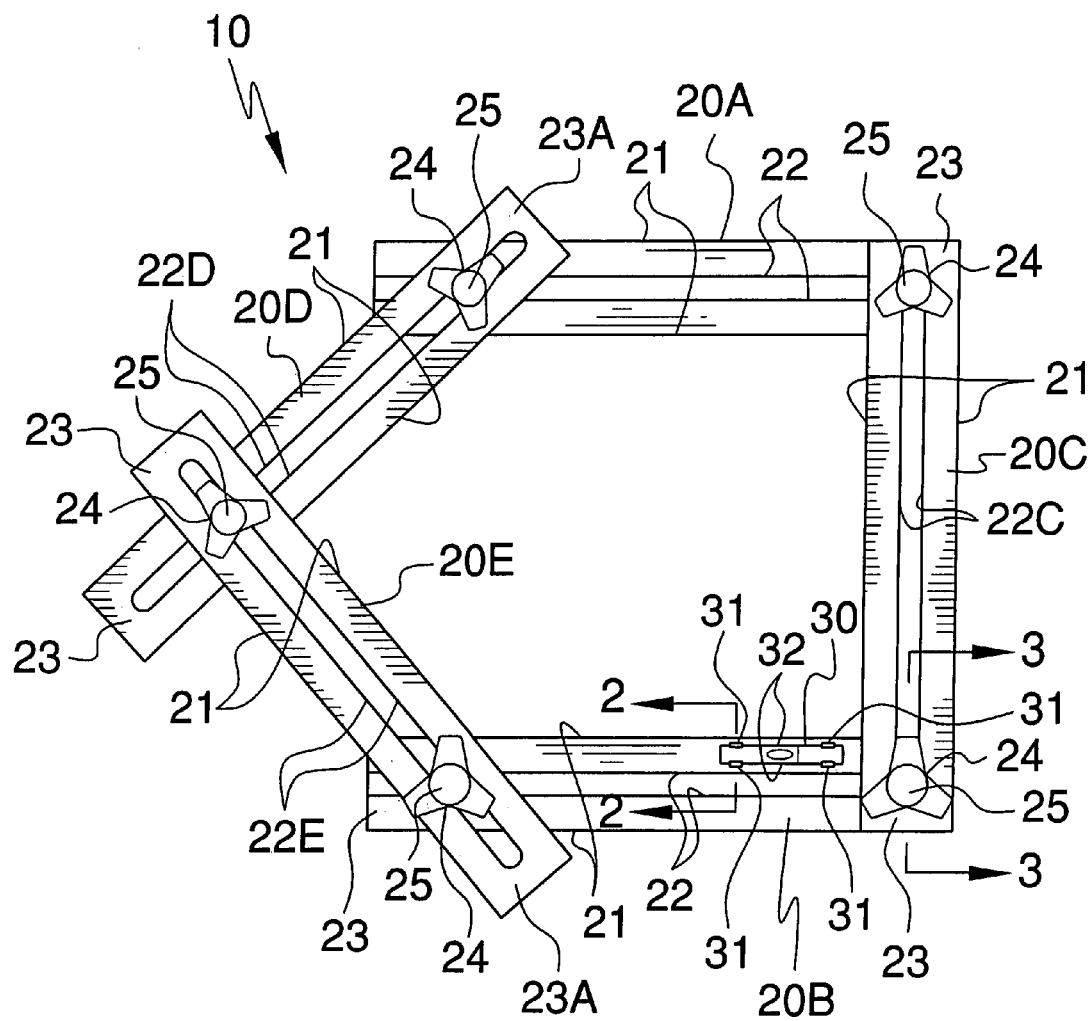
FIG. 1 is a top plan view showing an adjustable jig for use when INSTALLING bargeboards, in accordance with the present invention.
Figure 2:
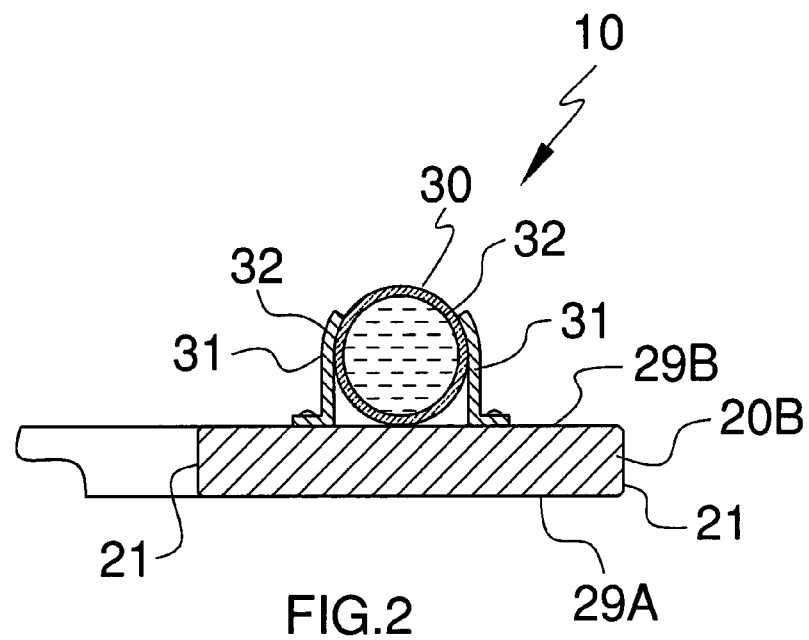
FIG. 2 is a cross-sectional view of the level gauge shown in FIG. 1, taken along line 2-2.
Figure 3:
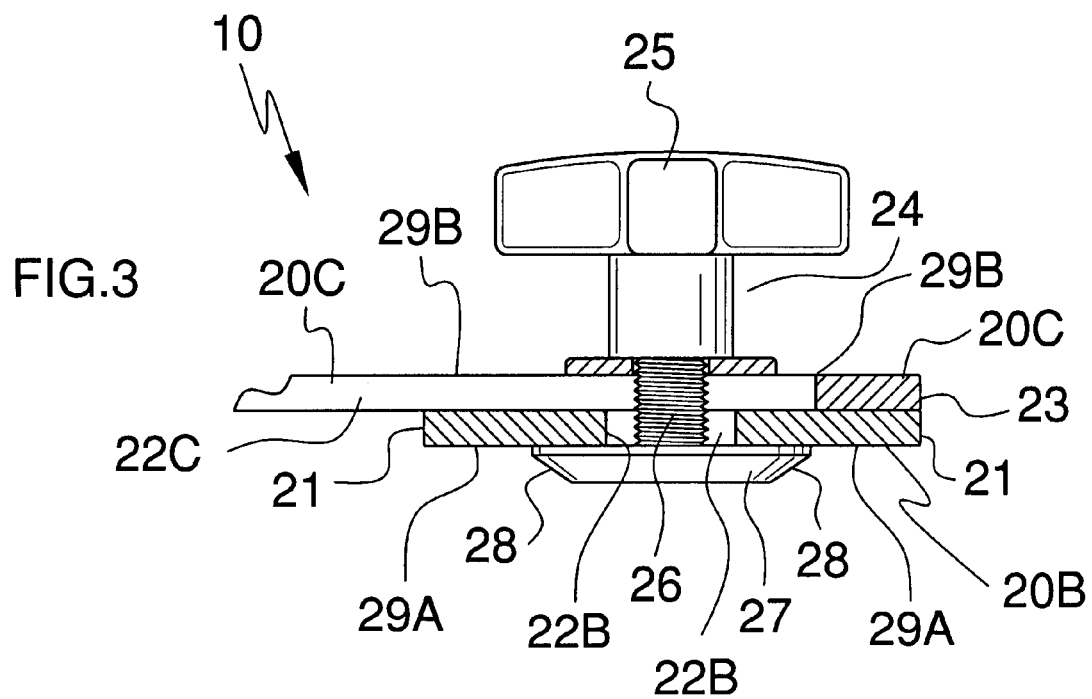
FIG. 3 is a cross-sectional view of the apparatus shown in FIG. 1, taken along line 3-3.

The apparatus of this invention is referred to generally in FIGS. 1-3 by the reference numeral 10 and is intended to protect an adjustable jig for use when INSTALLING bargeboards. It should be understood that the apparatus 10 may be used to provide a template for many different types of construction purposes and should not be limited in use to only bargeboard cuttings.

Referring initially to FIGS. 1 through 3, the apparatus 10 includes a plurality of arms 20 formed from rigid material. Of course, such material may include any suitable form of plastic, metal or wood, as is obvious to a person of ordinary skill in the art. Each arm 20 has a rectilinear shape provided with a centrally registered longitudinal axis and oppositely registered edges 21 that are equidistantly spaced from the respective axes. Such edges 21 of each arm 20 travel parallel to the respective axes and along an entire longitudinal length thereof respectively. Each arm 20 is provided with an elongated central opening 22 formed therein that is disposed along the respective axis. Each of the arms 20 also has axially opposed ends 23 abutted directly, without the use of intervening elements, with adjacent ones of the ends 23 of the arms 20 respectively.

Referring to FIG. 1, first 20A and second 20B ones of the arms 20 are registered parallel to each other. In a preferred embodiment, such first 20A and second 20B ones of the arms have a length equal to 450 mm. Of course, such first 20A and second 20B ones of the arms may be produced in a variety of alternate suitable lengths, as is obvious to a person of ordinary skill in the art. A third one 20C of the arms 20 is medially disposed therebetween and aligned orthogonal to the respective longitudinal axes of the first 20A and second 20B arms.

In a preferred embodiment, such a third arm 20C has a length equal to 350 mm. Of course, the third arm 20C may be produced in a variety of alternate suitable lengths, as is obvious to a person of ordinary skill in the art. Fourth 20D and fifth 20E ones of the arms 20 are situated obliquely to the first 20A and second 20B arms and are directly connected, without the use of intervening elements, thereto respectively. The fourth 20D and fifth 20E ones of the arms have equal lengths that are greater than half a length of the third arm 20C and less than a total length of the third arm 20C. Such fourth 20D and fifth 20E arms extend laterally outwardly and away from the first 20A and second 20B arms wherein distal ends 23A of the fourth 20D and fifth 20E arms are directly conjoined, without the use of intervening elements, at a location defined between the first 20A and second 20B arms, thus forming a relatively pentagonal shape.

The first arm 20A is selectively movable along a path corresponding to the opening 22C associated with the third arm 20C and the opening 22D associated with the fourth arm 20D. The second arm 20B is selectively movable along a path defined by a relative position of the opening 22C associated with the third arm 20C and the opening 22E associated with the fifth arm 20E. Conveniently, either one or both of the fourth 20D and fifth 20E ones of the arms can be removed, which is essential and advantageous for adapting the apparatus 10 between rectangular and triangular template shapes, respectively, as well.

Referring to FIGS. 1 and 3, a plurality of fasteners 24 are directly interfitted, without the use of intervening elements, within at least two of the openings 22 associated with at least two of the arms 20 such that the at least two arms 20 conveniently and effectively become statically affixed to each other during operating conditions. Each fastener 24 is also detachable from associated ones of the openings 22, which is crucial such that the arms 20 can effectively be linearly biased along the openings respectively. Each fastener 24 includes a tri-lobed nut 25 that has a threaded bottom end 26 positioned through selected ones of the openings 22.

A cap 27 is directly conjoined, without the use of intervening elements, to the threaded bottom end 26 of the tri-lobed nut 25. Such a cap 27 has an outwardly beveled perimeter 28 converging upwardly towards a bottom surface 29A of one of the arms 20, which is important and advantageous such that adjacently conjoined ones of the arms 20 remain statically conjoined during operating conditions, as is best shown in FIG. 3. Each arm 20 has at least two of the fasteners 24 interfitted through the openings 22 associated therewith respectively.

Referring to FIGS. 1 and 2, a level gauge 30 is included for advantageously and effectively establishing a horizontal plane along one of the arms 20. Such a level gauge 30 is releasably conjoined directly, without the use of intervening elements, to a top surface 29B of the one arm 20B and positioned at an interior one 21A of the edges 21 associated with the one arm 20B. Of course, such a level gauge 30 may be alternately positioned, as is obvious to a person of ordinary skill in the art. The second arm 20B includes a plurality of clips 31 directly attached thereto, without the use of intervening elements, and spaced apart adjacent to the opening 22B thereof. Such clips 31 are directly abutted, without the use of intervening elements, on opposed sides 32 of the level gauge 30, which is vital and advantageous such that the level gauge 30 is effectively maintained at a fixed position during operating conditions.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. An adjustable jig for assisting an operator when attaching a bargeboard to a gable end of a house and thereby save time and materials when a box end is required to finish off an end of a bargeboard where it meets a fascia on the house, said adjustable jig comprising:

a plurality of arms formed from rigid material, each said arms having a rectilinear shape provided with a centrally registered longitudinal axis and provided with oppositely registered edges equidistantly spaced from the respective axes, said edges of each said arms traveling parallel to the respective axes and along an entire longitudinal length thereof respectively, each said arms being provided with an elongated central opening formed therein and disposed along the respective axis, each said arms having axially opposed ends abutted directly with adjacent ones of said ends of said arms respectively;

a plurality of fasteners directly interfitted within at least two of said openings associated with at least two of said arms such that said at least two arms become statically affixed to each other during operating conditions, each said fasteners being detachable from associated ones of said openings such that said arms can be linearly biased along said openings respectively; and a level gauge for establishing a horizontal plane along one said arms, said level gauge being releasably conjoined directly to a top surface of said one arm and positioned at an interior one of said edges associated with said one arm;

wherein first and second ones of said arms are registered parallel to each other, a third one of said arms is medially disposed therebetween and aligned orthogonal to the respective longitudinal axes of said first and second arms;

wherein fourth and fifth ones of said arms are situated obliquely to said first and second arms and are directly connected thereto respectively, said fourth and fifth arms extending laterally outwardly and away from said first and second arms wherein distal ends of said fourth and fifth arms are directly conjoined at a location defined between said first and second arms.

2. The apparatus of claim 1, wherein said first arm is selectively movable along a path corresponding to said opening associated with said third arm and said opening associated with said fourth arm.

3. The apparatus of claim 1, wherein said second arm is selectively movable along a path defined by a relative position of said opening associated with said third arm and said opening associated with said fifth arm.

4. The apparatus of claim 1, wherein said second arm comprises: a plurality of clips directly attached thereto and spaced apart adjacent to said opening thereof, said clips being directly abutted on opposed sides of said level gauge such that said level gauge is maintained at a fixed position during operating conditions.

5. An adjustable jig for assisting an operator when attaching a bargeboard to a cable end of a house and thereby save time and materials when a box end is required to finish off an end of a bargeboard where it meets a fascia on the house, said adjustable jig comprising:

a plurality of arms formed from rigid material, each said arms having a rectilinear shape provided with a centrally registered longitudinal axis and provided with oppositely registered edges equidistantly spaced from the respective axes, said edges of each said arms traveling parallel to the respective axes and along an entire longitudinal length thereof respectively, each said arms being provided with an elongated central opening formed therein and disposed along the respective axis, each said arms having axially opposed ends abutted directly with adjacent ones of said ends of said arms respectively;

a plurality of fasteners directly interfitted within at least two of said openings associated with at least two of said arms such that said at least two arms become statically affixed to each other during operating conditions, each said fasteners being detachable from associated ones of said openings such that said arms can be linearly biased along said openings respectively;

wherein each said fasteners comprises a tri-lobed nut having a threaded bottom end position through selected ones of said openings, a cap directly conjoined to said threaded bottom end of said tri-lobed nut, said cap have an outwardly beveled perimeter converging upwardly towards a bottom surface of one said arms such that adjacently conjoined ones of said arms remain statically conjoined during operating conditions; and a level gauge for establishing a horizontal plane along one said arms, said level gauge being releasably conjoined directly to a top surface of said one arm and positioned at an interior one of said edges associated with said one arm;

wherein first and second ones of said arms are registered parallel to each other, a third one of said arms is medially disposed therebetween and aligned orthogonal to the respective longitudinal axes of said first and second arms;

wherein fourth and fifth ones of said arms are situated obliquely to said first and second arms and are directly connected thereto respectively, said fourth and fifth arms extending laterally outwardly and away from said first and second arms wherein distal ends of said fourth and fifth arms are directly conjoined at a location defined between said first and second arms.

6. The apparatus of claim 5, wherein said first arm is selectively movable along a path corresponding to said opening associated with said third arm and said opening associated with said fourth arm.

7. The apparatus of claim 5, wherein said second arm is selectively movable along a path defined by a relative position of said opening associated with said third arm and said opening associated with said fifth arm.

8. The apparatus of claim 5, wherein said second arm comprises: a plurality of clips directly attached thereto and spaced apart adjacent to said opening thereof, said clips being directly abutted on opposed sides of said level gauge such that said level gauge is maintained at a fixed position during operating conditions.

9. An adjustable jig for assisting an operator when attaching a bargeboard to a gable end of a house and thereby save time and materials when a box end is required to finish off an end of a bargeboard where it meets a fascia on the house, said adjustable jig comprising:

- a plurality of arms formed from rigid material, each said arms having a rectilinear shape provided with a centrally registered longitudinal axis and provided with oppositely registered edges equidistantly spaced from the respective axes, said edges of each said arms traveling parallel to the respective axes and along an entire longitudinal length thereof respectively, each said arms being provided with an elongated central opening formed therein and disposed along the respective axis, each said arms having axially opposed ends abutted directly with adjacent ones of said ends of said arms respectively;
- a plurality of fasteners directly interfitted within at least two of said openings associated with at least two of said arms such that said at least two arms become statically affixed to each other during operating conditions, each said fasteners being detachable from associated ones of said openings such that said arms can be linearly biased along said openings respectively;
- wherein each said fasteners comprises a tri-lobed nut having a threaded bottom end position through selected ones of said openings, a cap directly conjoined to said threaded bottom end of said tri-lobed nut, said cap have an outwardly beveled perimeter converging upwardly towards a bottom surface of one said arms such that adjacently conjoined ones of said arms remain statically conjoined during operating conditions;
- wherein each said arms has at least two of said fasteners interfitted through said openings associated therewith respectively; and
- a level gauge for establishing a horizontal plane along one said arms, said level gauge being releasably conjoined directly to a top surface of said one arm and positioned at an interior one of said edges associated with said one arm;
- wherein first and second ones of said arms are registered parallel to each other, a third one of said arms is medially disposed therebetween and aligned orthogonal to the respective longitudinal axes of said first and second arms;
- wherein fourth and fifth ones of said arms are situated obliquely to said first and second arms and are directly connected thereto respectively, said fourth and fifth arms extending laterally outwardly and away from said first and second arms wherein distal ends of said fourth and fifth arms are directly conjoined at a location defined between said first and second arms.

10. The apparatus of claim 9, wherein said first arm is selectively movable along a path corresponding to said opening associated with said third arm and said opening associated with said fourth arm.

11. The apparatus of claim 9, wherein said second arm is selectively movable along a path defined by a relative position of said opening associated with said third arm and said opening associated with said fifth arm.

12. The apparatus of claim 9, wherein said second arm comprises: a plurality of clips directly attached thereto and spaced apart adjacent to said opening thereof, said clips being directly abutted on opposed sides of said level gauge such that said level gauge is maintained at a fixed position during operating conditions.

* * * * *